(12) United States Patent
Yoshida et al.

(10) Patent No.: US 7,585,798 B2
(45) Date of Patent: Sep. 8, 2009

(54) LEAD-FREE GLASS MATERIAL FOR USE IN SEALING AND, SEALED ARTICLE AND METHOD FOR SEALING USING THE SAME

(75) Inventors: Masahiro Yoshida, Kagoshima (JP); Yasuo Hatate, Kagoshima (JP); Tsugumitsu Sarata, Kagoshima (JP); Yoshimitsu Uemura, Kagoshima (JP); Tomoyuki Honda, Kagoshima (JP)

(73) Assignee: Yamato Electronic Co., Ltd. (JP)

( * ) Notice: Subject to any disclaimer, the term of this patent is extended or adjusted under 35 U.S.C. 154(b) by 323 days.

(21) Appl. No.: 11/178,101

(22) Filed: Jul. 8, 2005

(65) Prior Publication Data

US 2006/0003883 A1   Jan. 5, 2006

Related U.S. Application Data

(63) Continuation of application No. PCT/JP03/08174, filed on Jun. 27, 2003.

(51) Int. Cl.
*C03C 8/24* (2006.01)
*C03C 8/14* (2006.01)
*C03C 8/08* (2006.01)
*C03C 8/04* (2006.01)
*C03C 3/16* (2006.01)
*C03C 3/21* (2006.01)

(52) U.S. Cl. .............. 501/15; 501/17; 501/24; 501/26; 501/45; 501/46

(58) Field of Classification Search .............. 501/17, 501/24, 45, 46, 15, 26
See application file for complete search history.

(56) References Cited

U.S. PATENT DOCUMENTS

| | | | |
|---|---|---|---|
| 3,534,209 A | 10/1970 | Anderson et al. | |
| 3,650,778 A * | 3/1972 | Dumesnil et al. | ............. 501/46 |
| 4,342,943 A * | 8/1982 | Weaver | ....................... 313/479 |
| 4,748,137 A | 5/1988 | Nigrin | |
| 5,013,360 A | 5/1991 | Finkelstein et al. | |
| 5,051,381 A | 9/1991 | Ohji et al. | |
| 5,188,990 A * | 2/1993 | Dumesnil et al. | ............. 501/19 |
| 5,252,521 A | 10/1993 | Roberts | |
| 5,306,674 A | 4/1994 | Ruderer et al. | |
| 5,326,591 A | 7/1994 | Roberts | |
| 5,336,644 A | 8/1994 | Akhtar et al. | |
| 2006/0019814 A1 * | 1/2006 | Baik et al. | .................... 501/49 |

FOREIGN PATENT DOCUMENTS

| | | |
|---|---|---|
| JP | 60-255643 | 12/1985 |
| JP | 04-114929 | 4/1992 |
| JP | 06-206737 | 7/1994 |
| JP | 06-263478 | 9/1994 |
| JP | 08-067533 | 3/1996 |
| JP | 08-180837 | 7/1996 |
| JP | 08-277140 | 10/1996 |
| JP | 08-325031 | 12/1996 |
| JP | 09-175833 | 7/1997 |
| JP | 09-188544 | 7/1997 |
| JP | 09-208259 | 8/1997 |
| JP | 09-227154 | 9/1997 |
| JP | 09-268026 | 10/1997 |
| JP | 09-278483 | 10/1997 |
| JP | 10-101365 | 4/1998 |
| JP | 10-236842 | 9/1998 |
| JP | 2000-113820 | 4/2000 |
| JP | 2000-128574 | 5/2000 |
| JP | 08-183632 | 7/2000 |
| JP | 2000-264676 | 9/2000 |
| JP | 2000-327370 | 11/2000 |
| JP | 2001-058844 | 3/2001 |
| JP | 2002-160937 | 6/2002 |
| JP | 2003-026444 | 1/2003 |
| JP | 2003-034550 | 2/2003 |
| JP | 2003-192378 | 7/2003 |
| JP | 2003-241048 | 8/2003 |
| JP | 2004-250276 | 9/2004 |

\* cited by examiner

*Primary Examiner*—Kevin P Kerns
*Assistant Examiner*—John A Hevey
(74) *Attorney, Agent, or Firm*—St. Onge Steward Johnston & Reens LLC

(57) ABSTRACT

A lead-free glass material for use in sealing, which has a glass composition being free of lead and exhibits high performance in the range of choices for the material to be sealed, the sealing processability, the sealing quality and the like, has a glass composition including four types of metal oxides of $V_2O_5$, $ZnO$, $BaO$ and $P_2O_5$ as essential ingredients.

6 Claims, No Drawings

LEAD-FREE GLASS MATERIAL FOR USE IN SEALING AND, SEALED ARTICLE AND METHOD FOR SEALING USING THE SAME

RELATED APPLICATIONS

This is a continuation of International Patent Application No. PCT/JP03/008174, filed Jun. 27, 2003.

TECHNICAL FIELD

The present invention relates to a lead-free glass material for use in sealing, which is used for sealing of an opening or a joint in various kinds of electronic components or electronic products such as an electron tube, a fluorescent tube, a fluorescent display panel, a plasma display panel and a semiconductor package, and to a sealed matter and a sealing method using the lead-free glass material.

BACKGROUND ART

As a general trend, a glass material for use in sealing is used for sealing of various kinds of electronic products which are used with the inside thereof being kept in a high vacuum and for sealing of electronic component packages for preventing entering of corrosive gas or moisture in order to ensure the operation stability. This glass material for use in sealing is made of low-melting glass powder, and a glass continuous layer having glass powder fused thereon is formed by pasting the powder with organic binder solution, coating a sealed portion of an article to be sealed with the pasted powder and burning the article in an electric furnace or the like to strip a vehicle ingredient.

Conventionally, mainly lead glass powder of $PbO$—$B_2O_3$ series is widely used as such a glass material for use in sealing. That is, lead glass having a low melting point and ease of melting of PbO can be used for sealing at a low processing temperature and within a wide temperature range, and lead glass having low thermal expansion, superior adhesion, superior adherence, superior chemical stability and the like provides advantages of high sealing property, high sealing strength and high durability.

However, since lead is a toxic substance, there is an occupational safety and health problem in a manufacturing step of lead glass, and there is a concern about how to deal with disposal of electronic components or electronic products, since disposal of untreated electronic components or electronic products at the end of life usefulness for which lead glass was used for sealing could cause soil contamination or groundwater contamination due to lead being eluted by acid rain or the like and disposal by landfill or the like is prohibited under recent strict environmental regulations while limited application due to inclusion of lead makes recycling difficult.

Suggested measures for such problems are: to use low-leaded glass including Pb of 10-23% for a stem mount or the like for sealing a glass valve (Japanese Unexamined Patent Publication No. 8-180837); and to provide a groove for preventing entry of etchant at a front plate and a back plate of a plasma display panel on the inner side of a marginal lead glass sealing portion, dip the plasma display panel at the end of life usefulness into etchant to remove lead glass of a sealing material selectively and repair a deteriorated portion for recycling (Japanese Unexamined Patent Publication No. 2000-113820). However, fundamental measures cannot be obtained since toxic lead is still included in the waste product even though the amount of lead can be decreased by using low-leaded glass as in the former method. Moreover, with the latter method of removing the lead glass sealing portion by etching, the amount of labor and costs required for the removing process causes a decrease in the advantage of recycling, and the method also has a cost disadvantage in a manufacturing stage due to formation of the groove.

Against this background, development of a glass material for use in sealing of lead-free series which can substitute a conventional general-purpose lead glass series has been strongly demanded. Therefore, the present inventors have already suggested lead-free glass materials for use in sealing of $B_2O_3$—$ZnO$—$BaO$ series and of $V_2O_5$—$ZnO$—$BaO$ series (Japanese Unexamined Patent Application No. 2001-391252) and a lead-free glass material for use in sealing of $V_2O_5$—$ZnO$—$BaO$—$TeO_2$ series (Japanese Unexamined Patent Application No. 2003-041695). These glass materials for use in sealing are of lead-free series, can be used for sealing at a low processing temperature and within a wide temperature range, have low thermal expansion coefficients, are superior in adhesion, sealing processability, adherence, chemical stability, strength and the like and comprise practical performance which can sufficiently substitute lead glass in a glass composition having a material oxide set within a specific ratio range.

Although the lead-free glass materials for use in sealing according to the above suggestions by the present inventors comprise superior practical performance as described above, it should be understood that development of a sealing material which offers higher performance in the range of choices for the material to be sealed, the sealing processability and the sealing quality is still desired.

DISCLOSURE OF THE INVENTION

In order to obtain a lead-free glass material of higher performance for use in sealing, the present inventors repeatedly made minute experiments and studies over an extended periods while conducting examinations on the suggested conventional technologies mentioned above from various angles. As a result, the inventors found that a glass composition of a quaternary system obtained by further adding $P_2O_5$ to a glass composition of $V_2O_5$—$ZnO$—$BaO$ series offers further enhanced thermal stability and has a smaller thermal expansion coefficient and, when the compounding ratio of these four ingredients is set within a specific range, thermal stability which largely surpasses that of a conventional general-purpose lead glass is obtained, a sealing process within an extremely wide temperature range is enabled and the thermal expansion coefficient becomes smaller than or equal to ¹⁄₁₀ of that of lead glass and, therefore, the range of setting of the thermal expansion characteristic corresponding to a sealed portion broadens, the range of the materials to be sealed broadens by that much, high reliability of a sealing portion is obtained and the production efficiency and the sealing processability as a sealing member are further enhanced, and thus readed the present invention.

That is, a lead-free glass material for use in sealing according to Claim 1 of the present invention has a glass composition including four types of metal oxides of $V_2O_5$, ZnO, BaO and $P_2O_5$ as essential ingredients.

Moreover, according to this lead-free glass material for use in sealing of Claim 1, the invention of Claim 2 is constructed to have a composition composed of $V_2O_5$ of 20-60% by weight, ZnO of 3-20% by weight, BaO of 10-50% by weight and $P_2O_5$ of 10-60% by weight, the invention of Claim 3 is constructed to have a composition composed of $V_2O_5$ of 35-60% by weight, ZnO of 5-10% by weight, BaO of 15-30% by weight and $P_2O_5$ of 20-50% by weight, and the invention of Claim 4 is constructed to have a composition composed of $V_2O_5$ of 40-50% by weight, ZnO of 5-10% by weight, BaO of 20-25% by weight and $P_2O_5$ of 21-35% by weight.

Furthermore, a lead-free glass material for use in sealing according to the invention of Claim 5 employs a structure including a refractory filler of 5-200 part by weight compounded for glass powder of 100 part by weight having the glass composition according to any one of Claims 1 to 4.

A lead-free glass material for use in sealing according to the invention of Claim 6 is composed of paste including organic binder solution added to glass powder having the glass composition according to any one of Claims 1 to 4, or to mixture powder of the glass powder and the refractory filler according to Claim 5. On the other hand, a lead-free glass material for use in sealing according to the invention of Claim 7 is composed of a compression molded material of glass powder having the glass composition according to any one of Claims 1 to 4, or of mixture powder of the glass powder and the refractory filler according to Claim 5.

A sealed matter according to the invention of Claim 8 employs a glass-based, ceramic-based or metal-based structure having an opening and/or a joint sealed with the lead-free glass material for use in sealing according to any one of Claims 1 to 7. Moreover, the invention of Claim 9 specifies a vacuum package, as the sealed matter of Claim 8, having the inside thereof being kept in a high vacuum.

Moreover, a sealing method according to the invention of Claim 10 is characterized in that a sealed portion of an article to be sealed is coated with a lead-free glass material for use in sealing composed of the paste according to Claim 6, tentative burning is performed for said article at around the softening point of lead-free glass included in the paste and then main burning is performed at around the crystallization starting temperature of the lead-free glass. Moreover, in the invention of Claim 11 according to this sealing method of Claim 10, the tentative burning is performed within a temperature range between the softening point minus 10° C. and the softening point plus 40° C. and the main burning is performed within a temperature range between the crystallization starting temperature minus 20° C. and the crystallization starting temperature plus 50° C.

The invention of Claim 1 provides a glass material for use in sealing, which has a lead-free glass composition of a quaternary system of $V_2O_5$—ZnO—BaO—$P_2O_5$, can be used for sealing at a low temperature and within a wide temperature range, offers preferable adhesion and adherence with respect to a sealed portion, rarely causes generation of flaking or a crack at a sealing portion, offers superior chemical stability and strength of a sealing glass layer and preferable durability of a sealing portion, provides glass itself of greenish black that eliminates the use of coloring performed for a conventional general-purpose lead glass sealing material, simplifies the manufacturing processes by that much and can reduce the manufacturing costs.

With the invention of Claim 2, since each oxide ingredient is set at a specific compounding ratio in the above lead-free glass material for use in sealing, a sealing process can be performed at a lower temperature, the sealing processability is further enhanced, the thermal expansion coefficient becomes lower and adjustment of the thermal expansion characteristic to that of a sealed portion is facilitated.

With the invention of Claim 3, since each oxide ingredient is set at a more suitable compounding ratio in the above lead-free glass material for use in sealing, the thermal stability is increased, the sealing processability is further enhanced, the thermal expansion coefficient becomes lower and the thermal expansion can be adjusted without particularly compounding a filler even when a sealed portion is made of a material having low thermal expansibility.

With the invention of Claim 4, since each oxide ingredient is set at the most suitable compounding ratio in the above lead-free glass material for use in sealing, extremely superior thermal stability is obtained and sealing processability which largely surpasses that of a conventional general-purpose lead glass material is obtained.

The invention of Claim 5 provides the above lead-free glass material for use in sealing, which includes a refractory filler and, therefore, can adjust the thermal expansion characteristic according to the material of a sealed portion easily and offers high strength of sealing glass.

The invention of Claim 6 provides the above lead-free glass material for use in sealing, which can be applied to a sealed portion of an article to be sealed easily in a paste form.

The invention of Claim 7 provides the above lead-free glass material for use in sealing, which is constituted of an integrated solid body and can be treated easily as a so-called preform component.

The invention of Claim 8 provides a sealed matter, which is sealed with the above lead-free glass material for use in sealing and, therefore, is superior in reliability of a sealing portion.

The invention of Claim 9 provides a vacuum package such as a fluorescent display panel, which is superior in reliability of a sealing portion.

With the sealing method according to the invention of Claim 10, since a sealed portion of an article to be sealed is coated with a lead-free glass material for use in sealing composed of the above paste, tentative burning is performed for this article at around the softening point of the lead-free glass included in the paste and then main burning is performed at around the crystallization starting temperature of the lead-free glass, it is possible to prevent generation of a pinhole due to deaeration or air bubbles in a sealing glass layer and, therefore, it is possible to enhance the reliability of sealing and the strength of the sealing portion.

With the invention of Claim 11, since the tentative burning and the main burning in the above sealing method are performed within specific temperature ranges, there is an advantage that a more preferable sealing quality is obtained.

BEST MODE FOR CARRYING OUT THE INVENTION

A lead-free glass material for use in sealing according to the present invention is basically lead-free glass having a glass composition of a quaternary system of $V_2O_5$—ZnO—BaO—$P_2O_5$, which reades a preferable amorphous glass state having fine fluidity by melting, can be used for sealing at a low temperature and within a wide temperature range, offers preferable adhesion and adherence with respect to a sealed portion that is made of glass, ceramic, metal or the like of an article to be sealed, has a small thermal expansion coefficient and enables easy adjustment of the thermal expansion characteristic to that of a sealed portion and, therefore, can prevent generation of flaking or the like at a sealing portion reliably for materials to be sealed having a wide range of thermal expansion characteristics and offers superior chemical stability and strength of a sealing glass layer and preferable durability of a sealing portion.

Moreover, this lead-free glass material for use in sealing of $V_2O_5$—ZnO—BaO—$P_2O_5$ series has the advantage that coloring which is performed for a conventional general-purpose lead glass sealing material becomes unnecessary since the glass itself is of greenish black, the manufacturing processes are simplified by that much and the manufacturing costs can be reduced. That is, general-purpose lead glass for a sealing material which is transparent and colorless is colored black by compounding, in general, a coloring material such as carbon black in order to facilitate the quality check of the sealing state by eyesight or an optical sensor and to give discrimination necessary for removing a sealing glass portion including toxic lead in a disposal process of a sealing product. On the other hand, although it is needless to remove a non-toxic lead-free glass material for use in sealing of the present invention in a disposal process of a sealing product, the quality check of the sealing state can be performed with no difficulty since the glass itself is colored.

Regarding such a lead-free glass material for use in sealing of $V_2O_5$—ZnO—BaO—$P_2O_5$ series, the content of $P_2O_5$ especially affects greatly the thermal characteristic and the sealing processability based thereon. Recommended as a suitable lead-free glass material is one having a glass composition including $V_2O_5$ of 20-60% by weight, ZnO of 3-20% by weight, BaO of 10-60% by weight and $P_2O_5$ of 10-60% by weight. This glass composition, which has a glass transition point Tg as low as approximately 300-450° C., can be used for sealing at a low temperature by that much, can reduce the thermal effect on an article to be sealed, can reduce the thermal energy consumption, has a difference $\Delta T$ between the crystallization starting temperature Tx and the glass transition point Tg, which gives an indication of the thermal stability, higher than or equal to approximately 80° C., offers fine sealing processability and has a thermal expansion coefficient smaller than $100 \times 10^{-7}/°$ C. and, therefore, facilitates adjustment of the thermal expansion characteristic to that of a sealed portion.

Moreover, a more suitable lead-free glass material is of a glass composition composed of $V_2O_5$ of 35-60% by weight, ZnO of 5-10% by weight, BaO of 15-30% by weight and $P_2O_5$ of 20-50% by weight, which has thermal stability $\Delta T$ (=Tx−Tg) larger than or equal to approximately 100° C., further enhances the sealing processability, has a thermal expansion coefficient smaller than $95 \times 10^{-7}/°$ C. and enables adjustment of the thermal expansion characteristic without particularly compounding a filler even when a sealed portion is made of a material having low thermal expansibility.

Furthermore, the most preferable lead-free glass material is one having a glass composition composed of $V_2O_5$ of 40-50% by weight, ZnO of 5-10% by weight, BaO of 20-25% by weight and $P_2O_5$ of 21-35% by weight, which has a glass transition point Tg lower than 400° C. and a crystallization starting temperature Tx higher than or equal to 600° C. Accordingly, this glass composition provides an ideal lead-free glass material for use in sealing, since the thermal stability $\Delta T$ (=Tx−Tg) is higher than or equal to 200° C. and is extremely high and sealing processability which largely surpasses that of a conventional general-purpose lead glass material (normally having $\Delta T$ of approximately 130° C.).

Although a lead-free glass material for use in sealing of the present invention has a small thermal expansion coefficient as described above, a refractory filler may be compounded in order to respond to a case where a sealed portion is made of a material having lower thermal expansibility. This refractory filler, which is powder of a high-melting material that does not melt at a temperature of a sealing process, functions to lower the thermal expansion coefficient of a sealing glass portion by compounding thereof and acts to enhance the strength of sealing glass. Even though the fluidity in a molten state generally lowers in such a case where a refractory filler is compounded in a glass material, a lead-free glass material for use in sealing of the present invention, which originally has fine fluidity in a molten state, is free from concern about lowering of the sealing processability due to compounding of the refractory filler.

Although any one having a melting point higher than that of glass of the sealing material may be used as such a refractory filler and there is no special limitation on type, it is suitable to use low-expansion ceramic powder such as cordierite, zirconyl phosphate, β-eucryptite, β-spodumene, zircon, alumina, mullite, silica, β-quartz solid solution, zinc silicate or aluminum titanate. The compounding quantity of such a refractory filler is preferably within a range of 5-200 part by weight for glass powder of 100 part by weight having the above glass composition, and a substantial effect of compounding cannot be obtained when the compounding quantity is to small while, on the contrary, the original characteristic of the glass composition is hampered and the performance as a glass material for use in sealing lowers when the compounding quantity is too large.

In order to manufacture a lead-free glass material for use in sealing of the present invention, it is only necessary to place oxide powder mixture which is the material into a container such as a platinum crucible, melt and vitrify the mixture by burning the same in a furnace such as an electric furnace for a predetermined time period, cast the molten material into an appropriate formwork such as an alumina boat and cool the same, and grind the obtained glass block to an appropriate grain size with a grinding machine. The refractory filler may be mixed by adding the same while grinding the above glass block or by adding the same to glass powder after grinding. Moreover, instead of the method of preliminarily melting and vitrifying all ingredients in a mixed state, it is possible to employ a so-called masterbatch method of melting and vitrifying an oxide which is the material excluding a partial ingredient, mixing powder of the excluded ingredients into the grinded material, melting and vitrifying the mixture by the second burning and grinding the same again in order to prevent deviation of the glass composition. It should be noted that the grain size of the glass powder is preferably within a range of 0.05-100 μm and the coarse particles generated in the grinding may be classified and removed. Moreover, the grain size of the refractory filler is also preferably within a range of 0.05-100 μm.

Although a lead-free glass material for use in sealing of the present invention is composed of glass powder having the glass composition described above or of powder mixture including a refractory filler compounded into the glass powder, the sealing material can be commercialized in a paste form for use in coating, which includes the powder dispersed into organic binder solution at a high concentration, in a molded form having a required shape, which is obtained by uniting the powder by compression molding, as a so-called preform component for use in sealing, or in other various forms, instead of the powder form.

Although there is no special limitation, the organic binder solution to be used for the above paste form may be prepared by, for example, dissolving cellulose binder such as cellulose nitrate or ethyl cellulose in solvent such as pine oil, butyl diglycol acetate, aromatic hydrocarbons solvent or mixed solvent such as thinner, or dissolving acrylic resin binder in solvent such as ketone, ester or a low-boiling aromatic one. The viscosity of the paste is preferably within a range of 100-2000 dPa·s from the aspect of coating activity to a sealed portion.

Moreover, although a lead-free glass material for use in sealing in a molded form can be molded by compression molding using only glass powder or only a powder mixture including a refractory filler compounded therein, it is preferable to perform compression molding for powder, which is mixed with a small amount of organic binder solution, from the aspect of moldability and yield. In order to provide sufficient mechanical strength, it is recommended to burn the compression molded material at a temperature higher than or equal to the softening point of the glass composition to fuse and unite the glass powder particles with each other. It should be noted that such a molded material may be molded to have a shape, such as a ring, a rectangular frame, a band or a flat piece, and a size appropriate for the form and the position of a sealed portion.

A sealing process with a lead-free glass material for use in sealing in a paste form may be performed by coating a sealed portion of an article to be sealed with the paste and burning the article in a furnace such as an electric furnace to melt and unite the glass powder and form a sealing glass layer. Although this burning can be performed at one time, the burning is preferably performed by two stages of tentative burning and main burning in order to enhance the sealing quality. That is, in the two-stages burning, a sealed portion of an article to be sealed is first coated with paste of a lead-free glass material for use in sealing, tentative burning is performed for this coated article at around the softening point of the lead-free glass included in the paste, so that the vehicle ingredient (binder and solvent) of the paste is stripped and thermally decomposed with only glass ingredient remaining, and main burning is then performed at around the crystallization starting temperature of the lead-free glass to form a sealing glass layer in which the glass ingredient is completely molten and united.

With such two-stage burning, since the vehicle ingredient is stripped and removed at the stage of tentative burning and glass ingredient is fused with each other in main burning, it is possible to prevent generation of a pinhole due to deaeration and air bubbles in the sealing glass layer and, therefore, it is possible to enhance the reliability of sealing and the strength of the sealing portion. Moreover, in a case where an article to be sealed requires sealing and junction of a plurality of members such as a vacuum package or requires sealing and fixation of sealed portions with an electrode, a lead wire, an exhaust pipe or the like being sandwiched therebetween, the tentative burning is performed for each member before assembling, members taken out of a furnace are then assembled into the form of a product and main burning may be performed in this assembly state.

It should be noted that the temperature range which is especially suitable for tentative burning is between the softening point minus 10° C. and the softening point plus 40° C. and the temperature range which is especially suitable for main burning is between the crystallization starting temperature minus 20° C. and the crystallization starting temperature plus 50° C. Moreover, it is preferable to perform tentative burning at a slow rate of temperature rise in order to separate air bubbles generated inside from the layer reliably and, in particular, at approximately 0.1-30° C./min from the room temperature to around the glass transition point and at approximately 0.1-10° C./min from around the glass transition point to around the softening point temperature. Moreover, it is preferable in main burning to increase the temperature at approximately 0.1-50° C./min from the room temperature to around the crystallization starting temperature and keep a constant temperature at around the crystallization starting temperature.

On the other hand, a sealing process with a lead-free glass material for use in sealing in a molded form may be performed by assembling an article to be sealed with the molded material being sandwiched between sealed portions and burning the article in this assembly state in a furnace such as an electric furnace to melt the molded material and form a sealing glass layer.

Although there is no special limitation for an object for which a sealing process with a lead-free glass material for use in sealing of the present invention is applied, and a variety of glass-based, ceramic-based or metal-based articles to be sealed for use in various kinds of electronic components or electronic products such as an electron tube, a fluorescent display panel, a plasma display panel or a semiconductor package or a wide field other than electronic/electric field are included. A lead-free glass material for use in sealing of the present invention, which is superior in reliability of sealing and the sealing strength, is especially superior in applicability to an article to be sealed which requires high sealing property such as a vacuum package having the inside thereof being kept in a high vacuum higher than or equal to $10^{-6}$ Torr during the manufacturing process or in the product form, such as a fluorescent display panel or an electron tube.

BEST SPECIFIC EMBODIMENT OF THE INVENTION

The following description will explain the present invention concretely using examples. It should be noted that all of the material oxides used in the following examples are reagent chemicals made by Wako Pure Chemical Industries and other analysis reagents and the like used are similarly reagent chemicals.

Example 1

$V_2O_5$ powder, ZnO powder, BaO powder and $P_2O_5$ powder are mixed as the material oxide at each of the ratios (% by weight) described in the following Table 1, the mixture was housed in a platinum crucible and burned in an electric furnace at approximately 1000° C. for 60 minutes, the molten material was then cast into an alumina boat to create a glass rod, the glass rod was cooled in the atmosphere, then grinded with a stamp mill (ANS 143 made by Nitto Kagaku Co., Ltd) and classified to collect powder having a grain size smaller than or equal to 100 μm, so that lead-free glass materials for use in sealing G1 to G7 were manufactured. It should be noted that the lead-free glass material G1 is of a glass composition by which the most preferable result in a ternary system of $V_2O_5$—ZnO—BaO is obtained.

Regarding the lead-free glass materials G1 to G7 manufactured in the above Example 1, the glass transition point Tg, the softening point Tf and the crystallization starting temperature Tx were measured with a differential thermal analysis device (DT-40 made by Shimadzu Corporation) using α-$Al_2O_3$ as the correlation sample, the thermal expansion coefficient was measured with a thermomechanical analysis device (TMA 8310 made by Rigaku Denki Corporation) and structural analysis was performed at a scan speed of 2 deg/min with a powder X-ray device (Geiger Flex 2013 made by Rigaku Denki Corporation) to check the structure of the glass texture. The results are shown in Table 1 together with the fluidity of the molten material cast from the platinum crucible into the alumina boat, the color shade of the created glass rod and ΔT (Tx−Tg).

TABLE 1

Lead-Free Glass Material for Use in Sealing

|  |  | G1 | G2 | G3 | G4 | G5 | G6 | G7 |
|---|---|---|---|---|---|---|---|---|
| Compounding Ratio of Material Oxide (wt %) | $V_2O_5$ | 60 | 54 | 48 | 46.2 | 45 | 42 | 36 |
|  | ZnO | 10 | 9 | 8 | 7.7 | 7.5 | 7 | 6 |
|  | BaO | 30 | 27 | 24 | 23.1 | 22.5 | 21 | 18 |
|  | $P_2O_5$ | 0 | 10 | 20 | 23 | 25 | 30 | 40 |
| Glass Transition Point Tg (° C.) |  | 280 | 297 | 335 | 343 | 353 | 386 | 454 |
| Softening Point Tf (° C.) |  | 310 | 322 | 367 | 367 | 383 | 416 | 600↑ |
| Crystallization Starting Temperature Tx (° C.) |  | 381 | 375 | 433 | 600↑ | 600↑ | 600↑ | 600↑ |
| Thermal Stability ΔT (° C.) |  | 101 | 78 | 98 | 257↑ | 247↑ | 214↑ | 146↑ |
| Thermal Expansion Coefficient ($\times 10^{-7}$/° C.) |  | 108.0 | 98.5 | 94.4 | 91.0 | 92.4 | 86.1 | 80.1 |
| Fluidity |  | Preferable | Preferable | Preferable | Preferable | Preferable | Preferable | Preferable |
| Color Shade of Glass |  | Blackish Green | Blackish Green | Blackish Green | Blackish Green | Blackish Green | Blackish Green | Blackish Green |
| Glass Structure |  | Amorphous | Amorphous | Amorphous | Amorphous | Amorphous | Amorphous | Amorphous |

As shown in Table 1, a lead-free glass material (G2-G7) having a glass composition including $V_2O_5$ of 20-60% by weight, ZnO of 3-20% by weight, BaO of 10-60% by weight and $P_2O_5$ of 10-60% by weight has a glass transition point Tg as low as approximately 300-450° C., thermal stability ΔT larger than or equal to approximately 80° C. and a thermal expansion coefficient which is smaller than or equal to $100\times 10^{-7}$/° C. and is smaller than that of a lead-free glass material (G1) of a ternary system of $V_2O_5$—ZnO—BaO. Furthermore, a lead-free glass material (G3-G7) having a glass composition including $V_2O_5$ of 35-60% by weight, ZnO of 5-10% by weight, BaO of 15-30% by weight and $P_2O_5$ of 20-50% by weight has thermal stability ΔT larger than or equal to approximately 100° C. and a thermal expansion coefficient smaller than $95\times 10^{-7}$/° C. In particular, a lead-free glass material (G4-G6) having a glass composition composed of $V_2O_5$ of 40-50% by weight, ZnO of 5-10% by weight, BaO of 20-25% by weight and $P_2O_5$ of 21-35% by weight has a glass transition point Tg lower than 400° C. and a crystallization starting temperature Tx larger than or equal to 600° C. and therefore has thermal stability ΔT which is larger than or equal to 200° C. and is extremely large, and it is clear that extremely superior sealing processability is obtained.

Example 2

Lead-free glass powder (having the mean grain size of 8.3 μm) of No. G5 obtained in Example 1 and a refractory filler (each having the mean grain size of 8.4 μm) were mixed at each of the ratios described in the following Table 2 and the mixture powder was burned at approximately 1000° C. for 60 minutes and grinded, so that lead-free glass materials including a refractory filler G8 to 11 were manufactured. The thermal expansion coefficients of these lead-free glass materials G8 to 11 were then measured similarly. The result is shown in Table 2. As shown in this Table 2, since the thermal expansion coefficient is decreased as the compounding ratio of the refractory filler is increased, the thermal expansibility of a sealing glass portion can be adjusted to the material of a sealed portion even when the sealed portion is made of a material having thermal expansibility lower than that of single lead-free glass.

TABLE 2

| Lead-Free Glass Material | Glass Powder | Refractory Filler | Mixture Ratio by Weight | Thermal Expansion Coefficient |
|---|---|---|---|---|
| G8 | Glass Powder of G5 | Zircon | 70/30 | 68.9 |
| G9 | Glass Powder of G5 | Zircon | 60/40 | 57.3 |
| G10 | Glass Powder of G5 | Zircon | 65/35 | 65.7 |
| G11 | Glass Powder of G5 | Cordierite | 80/20 | 60.1 |

Example 3

Thinner solution of ethyl cellulose was added to lead-free glass powder of No. G5 obtained in Example 1 and the solution was kneaded sufficiently to prepare lead-free glass material paste for use in sealing.

Example 4

Lead-free glass powder of No. G5 of 20 g, which was obtained in Example 1, and vehicle of 4 g, which was obtained by dissolving acrylic resin in acetone at a concentration of 5%, were kneaded, allowed to dry naturally for approximately one hour to make a acetone strip, grinded in a mortar, filled in a tablet compression mold and molded by compression molding with a mechanical powder press having the maximum welding pressure of 2 tons to mold the same by compression molding into a ring having an internal diameter of 2.8 mm, an outer diameter of 3.8 mm and a thickness of 2 mm and this compression molded material was burned in an electric furnace at the maximum temperature of 400° C., so that 100 ring-shaped lead-free glass materials as preform components for use in sealing were created.

[Sealing Test]

The circumferential edge of a case body made of soda lime glass of a fluorescent display package (having a length of 100 mm, a width of 40 mm and a thickness of 8 mm) was coated with lead-free glass material paste prepared in Example 3, one side of a cover plate made of soda lime glass of the package excluding the circumference was coated with a fluorescent material and portions of the circumference where electrodes and an exhaust pipe are arranged were coated with the above paste. Tentative burning was then performed for these rectangular case and cover plate in an electric furnace at approximately 400° C. While the case body and cover plate taken out of the electric furnace were then assembled into a package form with two metal electrode wires and one exhaust pipe being sandwiched therebetween, the ring-shaped lead-free glass material created in the above Example 4 was applied to a portion where the exhaust pipe was sandwiched, this assembled package was loaded in the electric furnace again with the form being held by a clip, main burning was performed at approximately 600° C. and the case body and the cover plate were sealed uniformly with the metal electrode wires and the exhaust pipe, to make a fluorescent display package.

[Lighting Test]

Using the fluorescent display package made in the above sealing test, the inside thereof was deaerated to a degree of vacuum higher than or equal to $10^{-6}$ Torr by a vacuum pump through the exhaust pipe on heating to 350° C., argon as discharge gas was introduced into inside thereof so that the discharge gas pressure became 70 Torr and the exhaust pipe was sealed. When lighting of this fluorescent display package was respectively checked immediately after sealing, 72 hours after sealing, 168 hours after sealing and 1344 hours after sealing with an input power of approximately 0.6 W by an inverter, a preferable lightning state was obtained at all the stages. Accordingly, it was proven that reliable sealing of a vacuum package can be performed with a lead-free glass material for use in sealing of the present invention.

The invention claimed is:

1. A lead-free glass material for use in sealing comprising a composition including as essential ingredients $V_2O_5$ of 40-50% by weight, ZnO of 5-10% by weight, BaO of 20-25% by weight and $P_2O_5$ of 21-35% by weight.

2. A lead-free glass material for use in sealing, which includes a refractory filler of 5-200 part by weight compounded for glass powder of 100 part by weight having the glass composition according to claim 1.

3. A lead-free glass material for use in sealing as in claim 1 or 2, further comprising a paste including an organic binder solution.

4. A lead-free glass material for use in sealing as in claim 1 or 2, further comprising a compression molded material.

5. A sealing method characterized in that a sealed portion of an article to be sealed is coated with a lead-free glass material for use in sealing composed of the lead-free glass material according to claim 3 tentative burning is performed for said article at around a softening point of lead-free glass and then main burning is performed at around a crystallization starting temperature of the lead-free glass.

6. The sealing method according to claim 5, wherein the tentative burning is performed within a temperature range between the softening point minus 10° C. and the softening point plus 40° C. and the main burning is performed within a temperature range between the crystallization starting temperature minus 20° C. and the crystallization starting temperature plus 50° C.

* * * * *